(No Model.)  5 Sheets—Sheet 1.
J. G. HARRISON.
MANUFACTURE OF AXLES FOR VEHICLES.
No. 384,521.  Patented June 12, 1888.
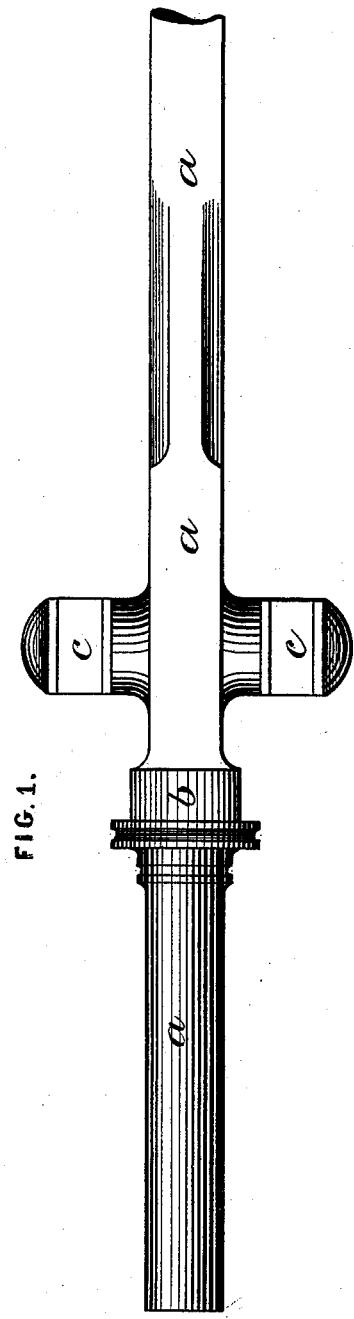
FIG. 1.
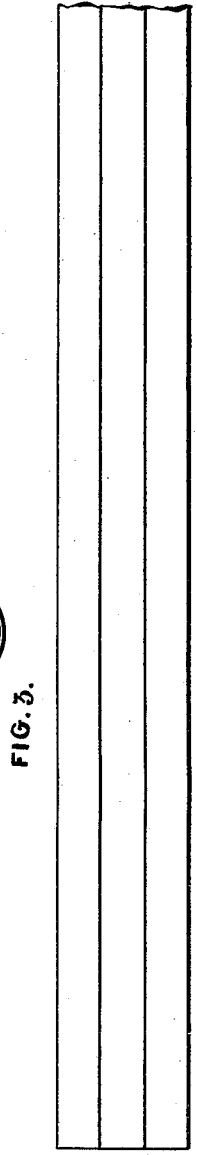
FIG. 3.
FIG. 2.
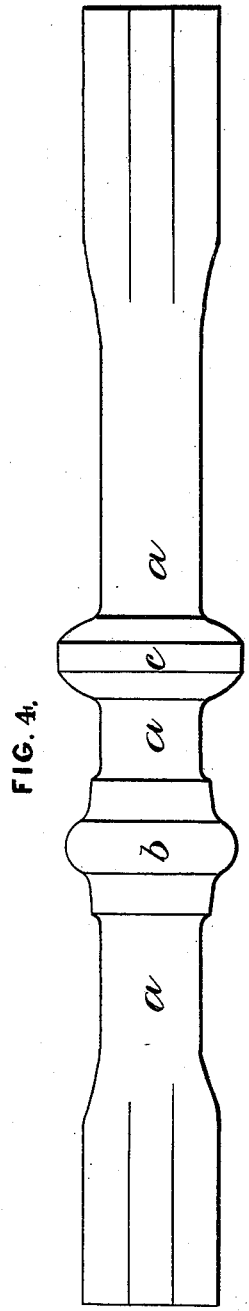
FIG. 4.
WITNESSES.
Henry Skerrett.
Frank W. E Bustow.
INVENTOR.
John George Harrison
Connolly Bros. Attys (No Model.) 5 Sheets—Sheet 2.
J. G. HARRISON.
MANUFACTURE OF AXLES FOR VEHICLES.
No. 384,521. Patented June 12, 1888.
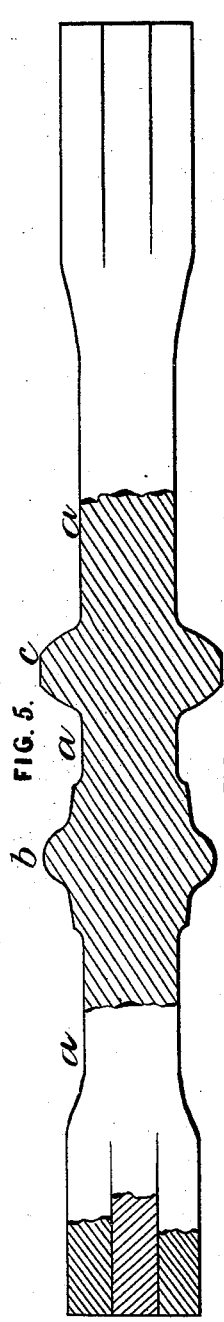
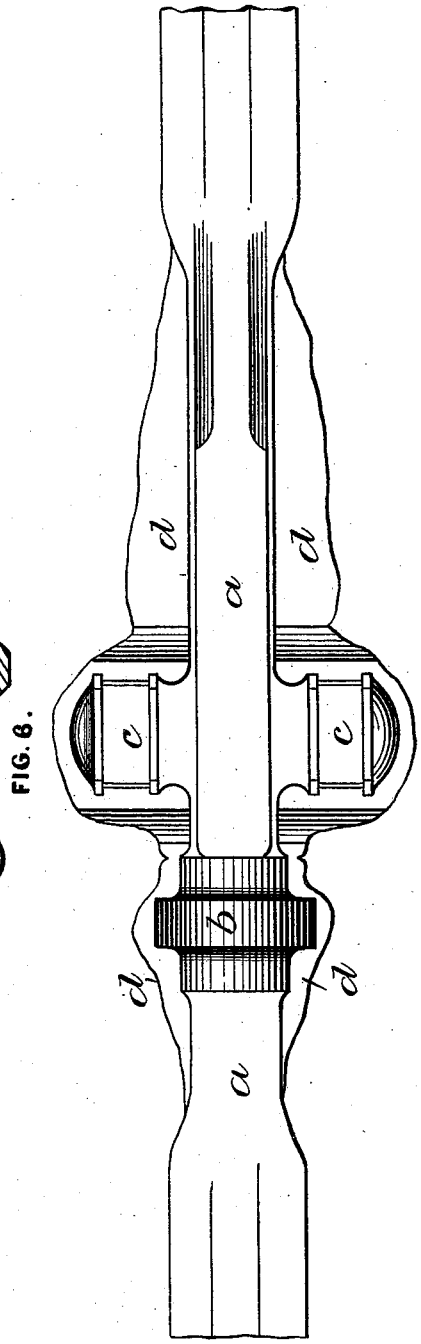
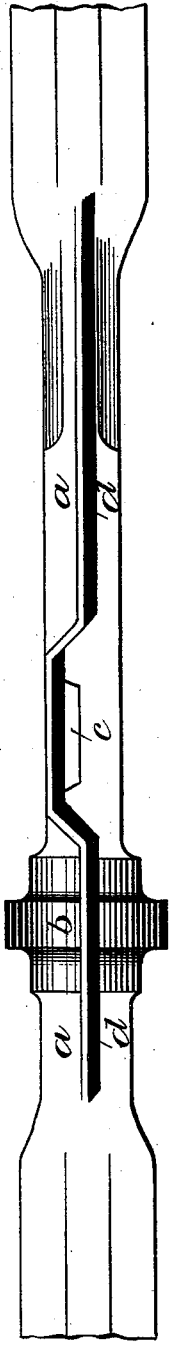

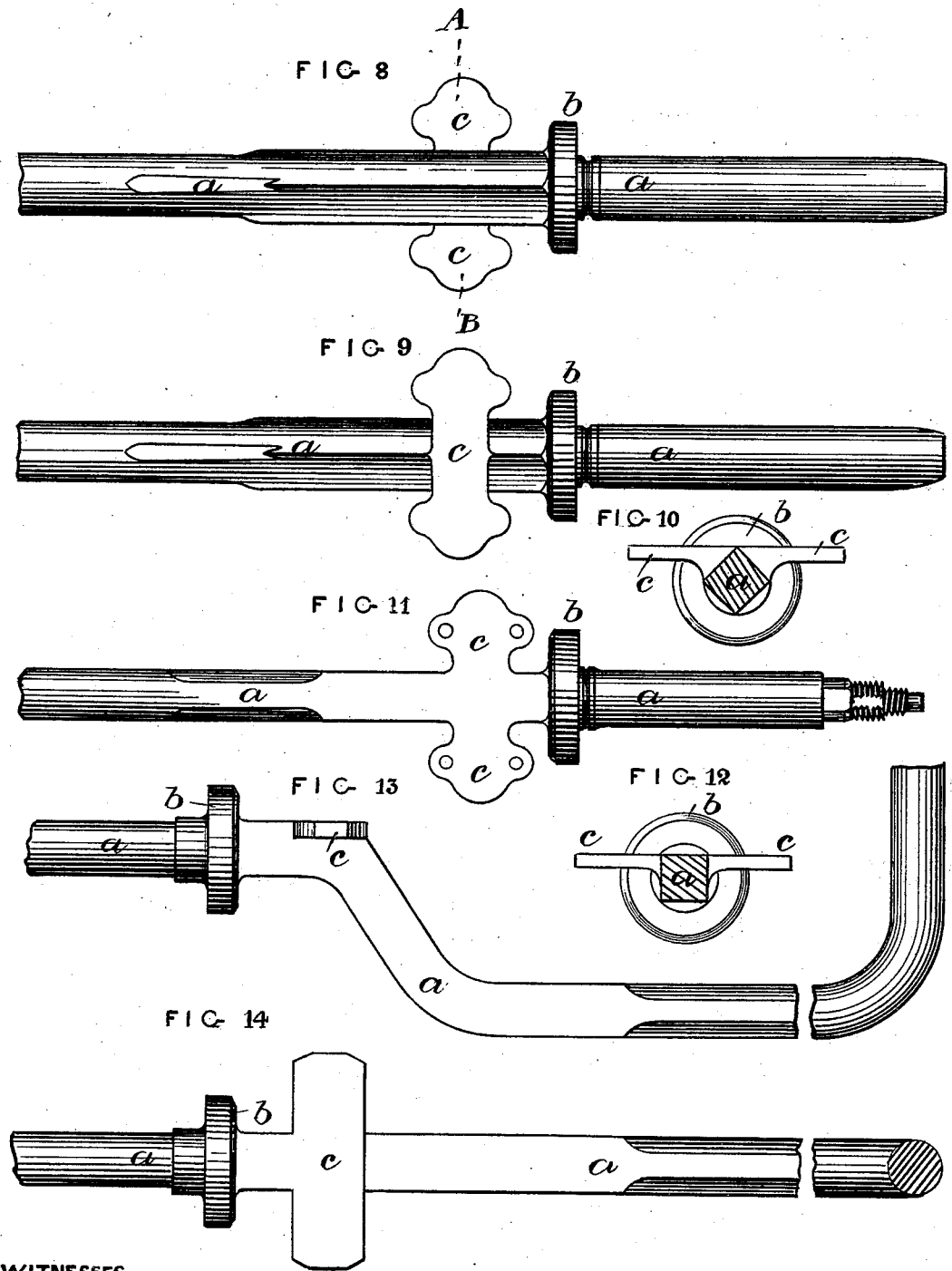

(No Model.) 5 Sheets—Sheet 4.
J. G. HARRISON.
MANUFACTURE OF AXLES FOR VEHICLES.

No. 384,521. Patented June 12, 1888.

WITNESSES. INVENTOR.
Albert B. Blackwood. J. G. Harrison.
Oscar W. Humphrey. by Connolly Bro
atts (No Model.) 5 Sheets—Sheet 5.

J. G. HARRISON.
MANUFACTURE OF AXLES FOR VEHICLES.

No. 384,521. Patented June 12, 1888.

WITNESSES,
Albert B. Blackwood.
Oscar W. Humphrey.

INVENTOR,
J. G. Harrison,
by Connolly Bros
Attys

United States Patent Office.

JOHN GEORGE HARRISON, OF 11 NOEL ROAD, EDGBASTON, ENGLAND.

MANUFACTURE OF AXLES FOR VEHICLES.

SPECIFICATION forming part of Letters Patent No. 384,521, dated June 12, 1888.

Application filed March 9, 1887. Serial No. 230,180. (No model.) Patented in England December 1, 1885, No. 14,712.

*To all whom it may concern:*

Be it known that I, JOHN GEORGE HARRISON, a subject of the Queen of Great Britain, residing at 11 Noel Road, Edgbaston, England, manager of works, have invented certain new and useful Improvements in the Manufacture of Axle-Trees for Wheeled Vehicles, (for which I have obtained a patent in Great Britain, No. 14,712, dated December 1, 1885;) and I do hereby declare the following to be a full, clear, and exact description of the invention, reference being had to the accompanying drawings, which form part of this specification.

The object of my invention is the production of axle-trees for wheeled vehicles without welds or cross-weldings—that is, making the collar, bed, and flap of axle-trees in one piece.

In carrying out my invention I propose making the body or bed of axle-trees, as is usual, with ordinary carriage axle-trees of a number of small bars or rods of iron bundled together, and which bundling together is called "fagoting" by axle-tree makers. I put the "fagot" to a proper heat for welding. I place it while at this heat between two dies, (upper and lower,) which are worked in conjunction with a steam-hammer, drop-stamp, or other similar machine. These dies have formed within them ball-shaped recesses cut or sunk therein at any suitable distance from each other, according to the form of axle-tree to be made. The two ball-shaped recesses are in communication with each other by a channel or neck, which, besides connecting the ball-recesses, extends outwardly to the ends of the dies. When the fagot is placed and worked between these dies at a welding heat, I continually turn the said fagot until a portion of the metal thereof has been forced into the cavities of the dies, thereby producing upon the middle of the fagot a counterpart of the die-recesses and channels. I propose making the fagot of square rods or bars of iron without using shorter pieces, which are known in the axle-tree trade as "splices and wedges," although, if necessary, these said splices and wedges may be used. The size or girth of the fagot I propose to employ in the making of an axle-tree is between the sizes of the channel or channels and the ball-shaped recesses in the dies—that is, the fagot is greater in diameter than the channels, but of less diameter than the ball-shaped recesses, so that on the fagot having been shaped between dies, as above stated, the middle part of the fagot will resemble or take the form of a dumb-bell, with tails or spindles of an equal length proceeding outwardly from each bulbous portion. The next process is to again heat the spindle or shaft and the bulbous portions described to a welding heat, and then place the same again between another pair of dies having cavities or sunken parts corresponding to the collar, bed, and flap of the axle-tree to be made. The part of the axle-tree which is known as the "collar" is that part against which the wheel of a carriage runs or takes its bearing for preventing the wheel of a vehicle from coming too close to the side of a carriage. The part called the "bed" is the whole of the axle-tree with the exception of the collar and flap. The flap is that part which projects and stands out on each side of the axle-tree bed, and is the means whereby the springs of a carriage are connected to the axle.

When I place the spindle or shaft having the two ball-shaped protuberances thereon in the second pair of dies, I place one of the balls or swells in that part cut in the dies to form the collar, while the other ball or swell is laid in the other recessed part, which is to form the flap, and that part of the axle-tree formed within the channels makes the bed. On the steam-hammer being brought to work while the metal is at a proper heat, the one ball will easily be fashioned to the shape of the collar, and the second ball will flow or spread itself into the interstices of the flap portions of the dies, so as to form the flaps, while the bed of the axle-tree will be formed into proper shape at the same time that the collars and flaps are made.

Figure 1 represents in plan (of lower side) an axle-tree made according to my invention, in which the collar, flaps, and bed are made out of the same piece of metal without welds or cross-weldings. Fig. 2 is a transverse sectional view of the fagot or blank. Fig. 3 is a side view of the same. Fig. 4 is a side view of a blank after being partly operated upon. Fig. 5 is a broken sectional view of the same. Fig. 6 is a plan view of a roughly-formed axle after being taken from the dies. Fig. 7 is a side view of the same. Fig. 8 is an under side and Fig. 9 a top view of a modified form of axle-tree. Fig. 10 is a transverse sectional view of the axle shown in Figs. 8 and 9. Fig. 11 is a plan view, and Fig. 12 a transverse sectional view, of a modified form of axle-tree. Fig. 13 is a side elevation, and Fig. 14 a plan view, of a still further modification. Fig. 15 is a plan view, top side of one of the dies for the balling process. Fig. 16 is a sectional view showing two of such dies brought together. Fig. 17 is a plan view of the top die for the formation of the corked or winged flaps. Fig. 18 is a plan view of the lower die used with die shown in Fig. 17. Fig. 19 is a sectional view showing both upper and lower dies of Figs. 17 and 18 together.

In carrying out my invention I take a series of square bars, and when fagoted together, as in Fig. 2, they form a blank, Fig. 3, shorter and thicker than an axle-tree to be made. I heat the said blank to a welding heat, and by means of a stamp and suitably-shaped dies, constructed as shown in Figs. 17, 18, and 19, (with sunken parts or cavities of the counterpart of Fig. 4,) I operate upon the middle part of the blank, so as to give it somewhat the figure of an axle-bed, $a$, with two adjacent bulb-like protuberances, $b$ $c$, as represented at Fig. 4. This operation, which I call the "balling-up process," is simply the accumulation of metal at two adjacent parts, and from which said accumulations the collar and spring-bearing flaps are made—that is, the collar of the axle-tree is made from the bulbous part $b$, while the flaps are made from the part $c$. Fig. 5 represents a part section of the said blank. I then reheat the partly-operated-upon blank, Fig. 4, and by means of a second pair of dies, (shaped to the counterpart of an axle-tree to be made,) I then give the fashioned blank the general figure of an axle-tree by placing the blank when at a welding heat upon the bottom die, B, when the upper die, B', is brought down upon it the required number of times, by which means the heated and soft metal is gradually forced into every part, or into the interstices of the dies, which gives the figure of a partly-made axle-tree of the kind represented in plan at Fig. 6 and edge view at Fig. 7.

In the forming of the roughly-formed axle-tree, Fig. 6, the upper and lower dies do not come into direct contact, the distance between the meeting faces being equal to the thickness of the web $d$. The superfluous metal or web $d$ is removed by a pair of clipping-tools. The axle-tree ends are drawn down or reduced by any suitable drawing-down expedients, when an axle-tree, Fig. 1, is thereby produced with a bed, $a$, collar $b$, and spring-bearing (corked) flaps $c$, all made solid and from one piece of metal without welds or cross-weldings.

Fig. 8 represents in plan of under side, and Fig. 9 a plan of upper side, another form of axle-tree (with butterfly flaps) made according to my invention. Fig. 10 is a transverse section on the dotted lines A B, Fig. 8, and Fig. 11 shows another form of axle-tree, of which Fig. 12 is a transverse section.

Fig. 13 represents in side elevation, and Fig. 14 in plan, a cranked axle-tree made according to my invention, in which the spring-bearing flaps are fetched up at the junction of the crank part with the straight part of the bed next to the collar.

Figure 15:
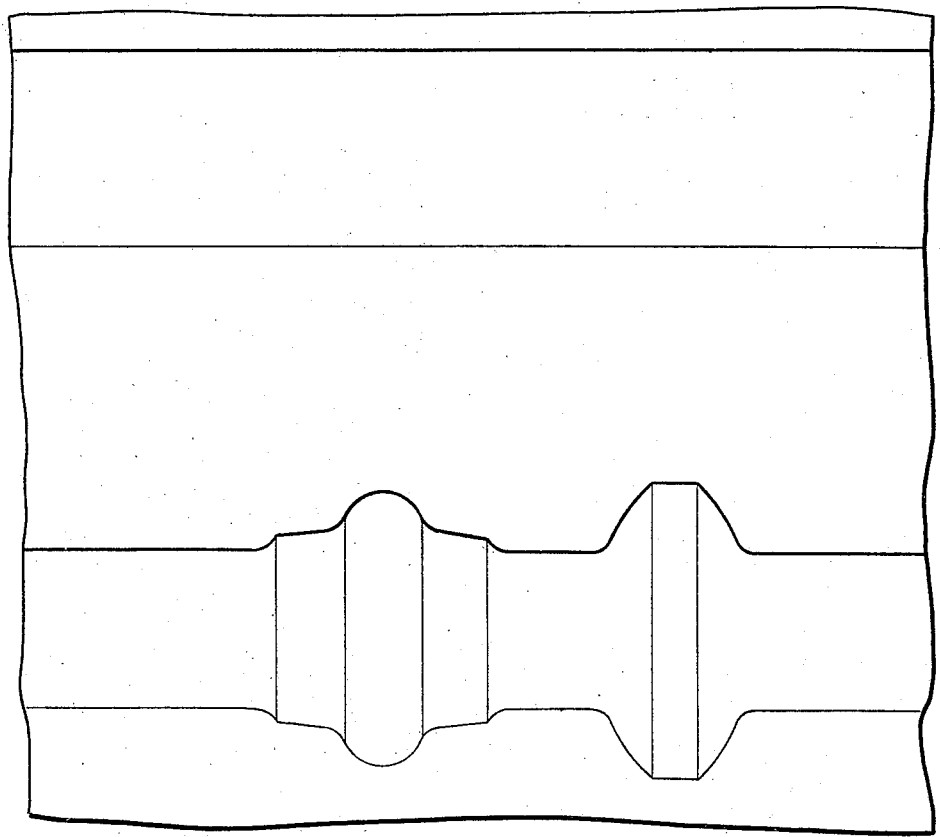
Figure 16:
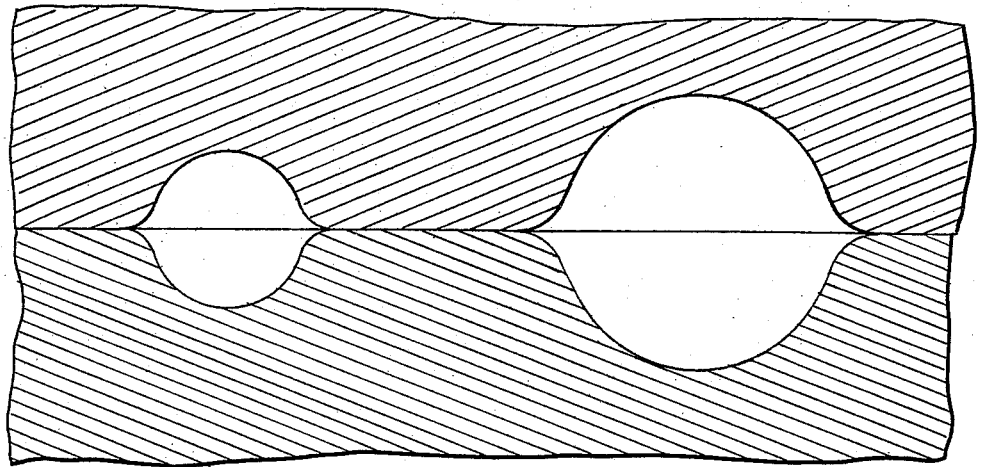
Figure 17:
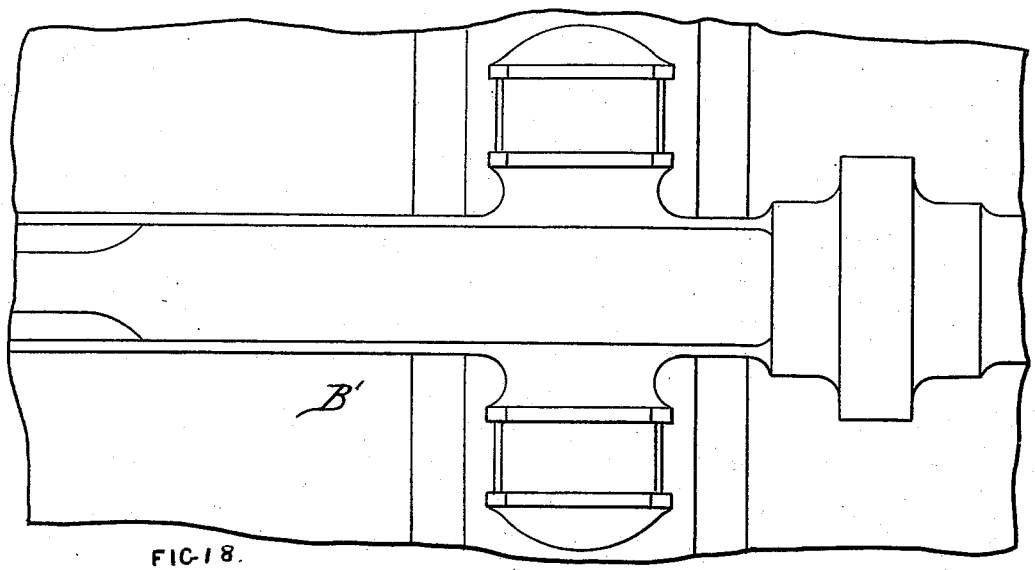
Figure 18:
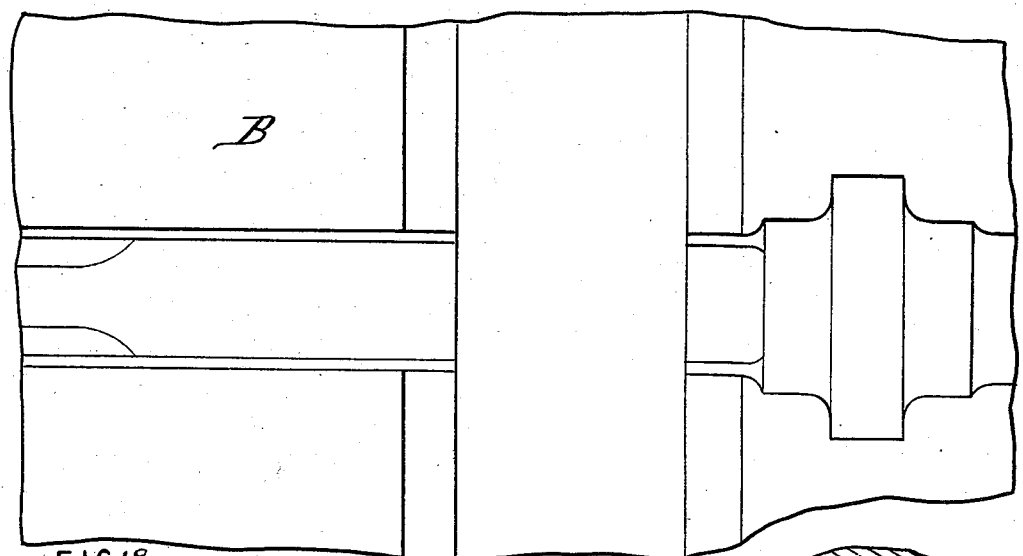
Figure 19:
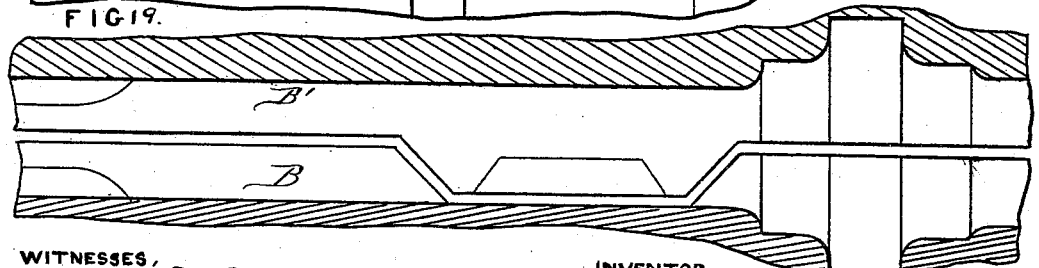

In the making of Collinge axle-trees, or where a superabundance of metal is required to produce an enlarged collar, I add a supplementary coil or splice of metal to the bulbous part, which are both fashioned together in the subsequent process of making the collar.

Having thus described my invention, I claim as new and desire to secure by Letters Patent—

1. The herein-described method of forming axle-trees, which consists in first subjecting the fagot to the action of dies having ball-shaped recesses for the formation of circular "collar-balls" upon the blank, the blank or fagot being constantly turned during the stamping operation, and then submitting the blank having such collars to the action of dies having laterally-extended recesses, which receive and shape the metal of one of said collars and form the flaps or side wings.

2. The method or process of forming axle-trees from fagots, which consists in first pressing or stamping the fagot in one set of dies, and thereby forming circular rounded beads or balls, and then in a second set of dies pressing said balls into the forms of the side wings or flaps and the collar, respectively, of an axle-tree, substantially as set forth.

In testimony that I claim the foregoing I have hereunto set my hand this 14th day of February, 1887.

JOHN GEORGE HARRISON.

Witnesses:
HENRY SKERRETT,
FRANK W. E. BRISTOW,
*Both of Birmingham.*